(12) United States Patent
Brunelle et al.

(10) Patent No.: US 8,796,399 B2
(45) Date of Patent: Aug. 5, 2014

(54) POLYETHERSULFONE COMPOSITIONS WITH HIGH HEAT AND GOOD IMPACT RESISTANCE

(75) Inventors: Daniel Joseph Brunelle, Burnt Hills, NY (US); Daniel Steiger, Clifton Park, NY (US)

(73) Assignee: Sabic Innovative Plastics IP B.V. (NL)

( * ) Notice: Subject to any disclaimer, the term of this patent is extended or adjusted under 35 U.S.C. 154(b) by 88 days.

(21) Appl. No.: 13/361,679

(22) Filed: Jan. 30, 2012

(65) Prior Publication Data

US 2012/0130042 A1 May 24, 2012

Related U.S. Application Data

(60) Division of application No. 11/552,276, filed on Oct. 24, 2006, now Pat. No. 8,106,135, which is a continuation-in-part of application No. 10/951,299, filed on Sep. 27, 2004, now abandoned.

(51) Int. Cl.
*C08G 75/23* (2006.01)
*C08F 283/06* (2006.01)
*C08L 81/00* (2006.01)

(52) U.S. Cl.
USPC ........ 525/537; 525/328.5; 528/391; 528/367; 528/373; 528/425

(58) Field of Classification Search
USPC ........ 528/391, 367, 373, 425; 525/537, 328.5
See application file for complete search history.

(56) References Cited

U.S. PATENT DOCUMENTS

| 8,106,135 B2 | 1/2012 | Brunelle et al. |
| 2005/0113558 A1 | 5/2005 | Johnson et al. |
| 2006/0069236 A1 | 3/2006 | Brunelle et al. |

FOREIGN PATENT DOCUMENTS

| EP | 1640403 A2 | 3/2006 |
| EP | 1640403 A3 | 5/2006 |

(Continued)

OTHER PUBLICATIONS

International Search Report for PCT/US2007/075782 International Filing Date Aug. 13, 2007, Mailing Date Nov. 26, 2007 (5 pages).

(Continued)

*Primary Examiner* — Duc Truong
(74) *Attorney, Agent, or Firm* — Cantor Colburn LLP

(57) ABSTRACT

Polyethersulfones having Tg greater than about 225° C. and a notched Izod value greater than about 1 ft-lb/in, as measured by ASTM D256, comprise from about 5 mol % to less than about 40 mol % structural units of formula 1; and

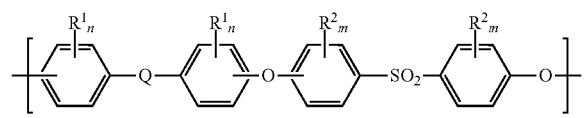

from greater than about 60 mol % to about 95 mol % structural units of formula 2

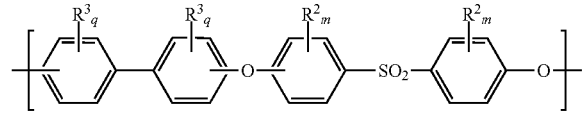

wherein
$R^1$, $R^2$, and $R^3$ are independently at each occurrence a halogen atom, a nitro group, a cyano group, a $C_1$-$C_{12}$ aliphatic radical, $C_3$-$C_{12}$ cycloaliphatic radical, or a $C_3$-$C_{12}$ aromatic radical;
n, m, q are independently at each occurrence integers from 0 to 4; and
Q is a $C_3$-$C_{20}$ cycloaliphatic radical, or a $C_3$-$C_{20}$ aromatic radical.

6 Claims, 1 Drawing Sheet

(56) References Cited

FOREIGN PATENT DOCUMENTS

| JP | 2003-321556 | 11/2003 |
| WO | 8901003 A1 | 2/1989 |
| WO | 2007112198 A1 | 10/2007 |

OTHER PUBLICATIONS

Written Opinion of the International Searching Authoirty for PCT/US2007/075782 International Filing Date Dec. 8, 2007, Mailing Date Nov. 26, 2007 (5 pages).

POLYETHERSULFONE COMPOSITIONS WITH HIGH HEAT AND GOOD IMPACT RESISTANCE

CROSS REFERENCE TO RELATED APPLICATIONS

This application is a division of U.S. Nonprovisional patent application Ser. No. 11/552,276, filed Oct. 24, 2006 now U.S. Pat. No. 8,106,135, which claims the benefit of U.S. application Ser. No. 10/951,299, filed Sep. 27, 2004 now abandoned, the entire contents of which are incorporated herein by reference.

BACKGROUND OF THE INVENTION

This invention relates to a polyethersulfone composition, a method to synthesize the polyethersulfone composition and articles made from the composition.

Polyethersulfones are a commercially important family of high performance, high temperature amorphous thermoplastics. These polymers are of interest to many industries because of their combination of high heat resistance, hydrolysis resistance in steam and hot water environments and good overall chemical resistance. Another reason these polymers are of great commercial interest is because in addition to offering the stated high performance attributes, they are also transparent, unlike most semi-crystalline materials which are also used in high temperature applications.

Polyethersulfones can be produced by a variety of methods. For example, U.S. Pat. Nos. 4,108,837 and 4,175,175 describe the preparation of polyarylethers and in particular polyarylethersulfones. U.S. Pat. No. 6,228,970 describes the preparation polyarylethersulfones with improved polydispersity and lower amounts of oligomers. British patent GB 1,264,900 teaches a process for production of a polyethersulfone comprising structural units derived from 4,4'-biphenol, bisphenol-A (4,4'-isopropylidenediphenol), and 4,4'-dichlorodiphenylsulfone.

The transparency of polyarylethersulfones makes them suitable for use in a variety of applications such as lids and covers for surgical and dental instrument sterilization trays which have to undergo steam autoclave sterilization. In the application just mentioned, the contents of the sterilization trays may by virtue of the transparency of the polyethersulfone, be inventoried by visual inspection without exposing the contents to the environment. Other uses and potential uses of polyethersulfones include pet transport containers, and dairy processing equipment, particularly milking machine components. Food and beverage applications also include uses such as coffee serving carafes and containers, microwave cookware, covers for cookware containers, and doors and windows for appliances, such as rotisserie grills. The inherent flammability resistance and low smoke release characteristics of polyethersulfones, particularly those of polyetherphenylsulfone, enhance the utility of such polymers in applications such as mass transit where low heat release on combustion and low toxic smoke emission properties of components used in passenger compartments are of critical concern. In the aircraft industry, in particular, the low flammability and low smoke attributes of polyethersulfones make such materials suitable for use in a variety of aircraft cabin interior components.

While the currently available polyethersulfones typically possess intermediate heat resistance, it would be desirable to improve their heat resistance while still maintaining or improving their impact properties. This would improve the utility of these polymers in a number of applications, especially in applications such as automotive headlight reflectors, medical trays, aircraft cabin interior components, consumer oriented hot food or beverage service items like tableware and baby bottles, pet transport containers, surgical trays, coffee serving carafes, cookware containers, where improving impact resistance at higher temperatures would be highly desirable. It is axiomatic that the deficiencies of currently available materials are tolerated because viable alternatives are lacking. Key areas for improvement in order to maximize the utility of polyethersulfones are; physical/mechanical integrity at high temperatures, hot water resistance, resistance to cleaning agents, and chemical inertness of the resin under conditions of use.

Commercially important polyarylethersulfones include polysulfone (PSU), polyphenylsulfone (PPSU) and polyethersulfone (PES). PSU is a well-known high temperature amorphous engineering thermoplastic resin exhibiting a glass transition temperature (Tg) of about 185° C., high strength, stiffness and toughness over a temperature range of from about −100° to 150° C. PSU has an Izod impact strength value (Notched Izod value) of about 69 Jm$^{-1}$ (1.3 ft-lb/in). PSU was commercially introduced in 1965 by the Union Carbide Corporation and is commercially available as UDEL® polysulfone from Solvay Advanced Polymers LLC. Another versatile polyarylethersulfone polymer is polyphenylsulfone (PPSU). PPSU is commercially available from Solvay Advanced Polymers LLC under the trademark of RADEL®. It has a Tg of 220° C. and an Izod impact strength value of about 700 Jm$^{-1}$ (13 ft-lb/in).

In various applications it would be highly desirable to produce polyarylethersulfones with higher glass transition temperatures (i.e. increased heat resistance) relative to known polyethersulfones, while maintaining or improving the high impact strength typically exhibited by materials of the polyethersulfone class. In order to achieve higher heat resistance in polyethersulfones having excellent impact strength, improvements in the design of the polyethersulfone compositions are necessary.

BRIEF SUMMARY OF THE INVENTION

The present invention provides a polyethersulfone composition comprising structural units I

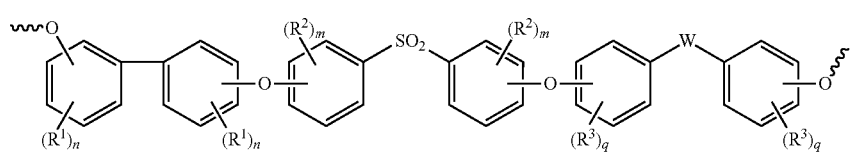

wherein $R^1$, $R^2$, and $R^3$ are independently at each occurrence a halogen atom, a nitro group, a cyano group, a $C_1$-$C_{12}$ aliphatic radical, $C_3$-$C_{12}$ cycloaliphatic radical, or a $C_3$-$C_{12}$ aromatic radical; n, m, q are independently at each occurrence integers from 0 to 4; W is a $C_3$-$C_{20}$ cycloaliphatic radical or a $C_3$-$C_{20}$ aromatic radical; and wherein said composition comprises greater than 5 mole percent aromatic ether structural units derived from at least one bisphenol having structure II

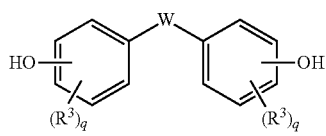

II wherein $R^3$ is independently at each occurrence a halogen atom, a nitro group, a cyano group, a $C_1$-$C_{12}$ aliphatic radical, $C_3$-$C_{12}$ cycloaliphatic radical, or a $C_3$-$C_{12}$ aromatic radical; q is independently at each occurrence an integer from 0 to 4; W is a $C_3$-$C_{20}$ cycloaliphatic radical or a $C_3$-$C_{20}$ aromatic radical.

DETAILED DESCRIPTION OF THE INVENTION

Figure 1:
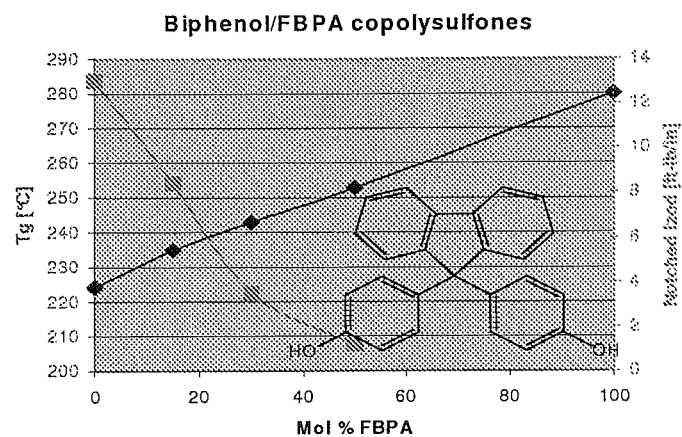
FIG. 1 shows the effect of co-monomer concentration on product polyethersulfone glass transition temperature and Notched Izod value for copolymers of bis(4-chlorophenyl) sulfone, biphenol and fluorenylidenyl bisphenol A.

The present invention may be understood more readily by reference to the following detailed description of preferred embodiments of the invention and the examples included therein. In the following specification and the claims which follow, reference will be made to a number of terms which shall be defined to have the following meanings.

The singular forms "a", "an" and "the" include plural referents unless the context clearly dictates otherwise.

As used herein, the term "Optional" or "optionally" means that the subsequently described event or circumstance may or may not occur, and that the description includes instances where the event occurs and instances where it does not.

As used herein the term "integer" means a whole number which includes zero. For example, the expression "n is an integer from 0 to 4" means "n" may be any whole number from 0 to 4 including 0.

As used herein, the terms "4,4'-biphenol" and "4,4'-dihydroxybiphenyl", "4,4'-dihydroxydiphenyl" (CAS No. 92-88-6) are intended to have the same meaning and may be used interchangeably.

As used herein the term "aliphatic radical" refers to a radical having a valence of at least one comprising a linear or branched array of atoms which is not cyclic. The array may include hetero atoms such as nitrogen, sulfur, silicon, selenium and oxygen or may be composed exclusively of carbon and hydrogen. Aliphatic radicals may be "substituted" or "unsubstituted". A substituted aliphatic radical is defined as an aliphatic radical which comprises at least one substituent. A substituted aliphatic radical may comprise as many substituents as there are positions available on the aliphatic radical for substitution. Substituents which may be present on an aliphatic radical include but are not limited to halogen atoms such as fluorine, chlorine, bromine, and iodine. Substituted aliphatic radicals include trifluoromethyl, hexafluoroisopropylidene, chloro methyl; difluorovinylidene; trichloromethyl, bromoethyl, bromotrimethylene (e.g. —$CH_2CHBrCH_2$—), and the like. For convenience, the term "unsubstituted aliphatic radical" is defined herein to encompass, as part of the "linear or branched array of atoms which is not cyclic" comprising the unsubstituted aliphatic radical, a wide range of functional groups. Examples of unsubstituted aliphatic radicals include allyl, aminocarbonyl (i.e. —$CONH_2$), carbonyl, dicyanoisopropylidene (i.e. —$CH_2C(CN)_2CH_2$—), methyl (i.e. —$CH_3$), methylene (i.e. —$CH_2$—), ethyl, ethylene, formyl, hexyl, hexamethylene, hydroxymethyl (i.e. —$CH_2OH$), mercaptomethyl (i.e. —$CH_2SH$), methylthio (i.e. —$SCH_3$), methylthiomethyl (i.e. —$CH_2SCH_3$), methoxy, methoxycarbonyl, nitromethyl (i.e. —$CH_2NO_2$), thiocarbonyl, trimethylsilyl, t-butyldimethylsilyl, trimethyoxysilylpropyl, vinyl, vinylidene, and the like. Aliphatic radicals are defined to comprise at least one carbon atom. A $C_1$-$C_{10}$ aliphatic radical includes substituted aliphatic radicals and unsubstituted aliphatic radicals containing at least one but no more than 10 carbon atoms.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. Aromatic radicals may be "substituted" or "unsubstituted". A substituted aromatic radical is defined as an aromatic radical which comprises at least one substituent. A substituted aromatic radical may comprise as many substituents as there are positions available on the aromatic radical for substitution. Substituents which may be present on an aromatic radical include, but are not limited to halogen atoms such as fluorine, chlorine, bromine, and iodine. Substituted aromatic radicals include trifluoromethylphenyl, hexafluoroisopropylidenebis(4-phenyloxy) (i.e. —OPhC($CF_3$)$_2$ PhO—), chloromethylphenyl; 3-trifluorovinyl-2-thienyl; 3-trichloromethylphenyl (i.e. 3-CCl$_3$Ph-), bromopropylphenyl (i.e. BrCH$_2$CH$_2$CH$_2$Ph-), and the like. For convenience, the term "unsubstituted aromatic radical" is defined herein to encompass, as part of the "array of atoms having a valence of at least one comprising at least one aromatic group", a wide range of functional groups. Examples of unsubstituted aromatic radicals include 4-allyloxyphenoxy, aminophenyl (i.e. H$_2$NPh-), aminocarbonylphenyl (i.e. NH$_2$COPh-), 4-benzoylphenyl, dicyanoisopropylidenebis(4-phenyloxy) (i.e. —OPhC(CN)$_2$PhO—), 3-methylphenyl, methylenebis(4-phenyloxy) (i.e. —OPhCH$_2$PhO—), ethylphenyl, phenylethenyl, 3-formyl-2-thienyl, 2-hexyl-5-furanyl; hexamethylene-1,6-bis(4-phenyloxy) (i.e. —OPh(CH$_2$)$_6$PhO—);

4-hydroxymethylphenyl (i.e. 4-HOCH$_2$Ph-), 4-mercaptomethylphemyl (i.e. 4-HSCH$_2$Ph-), 4-methylthiophenyl (i.e. 4-CH$_3$SPh-), methoxyphenyl, methoxycarbonylphenyloxy (e.g. methyl salicyl), nitromethylphenyl (i.e. -PhCH$_2$NO$_2$), trimethylsilylphenyl, t-butyldimethylsilylphenyl, vinylphenyl, vinylidenebis(phenyl), and the like. The term "a C$_3$-C$_{10}$ aromatic radical" includes substituted aromatic radicals and unsubstituted aromatic radicals containing at least three but no more than 10 carbon atoms. The aromatic radical 1-imidazolyl (C$_3$H$_2$N$_2$—) represents a C$_3$ aromatic radical. The benzyl radical (C$_7$H$_8$—) represents a C$_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethy group (C$_6$H$_{11}$CH$_2$—) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. Cycloaliphatic radicals may be "substituted" or "unsubstituted". A substituted cycloaliphatic radical is defined as a cycloaliphatic radical which comprises at least one substituent. A substituted cycloaliphatic radical may comprise as many substituents as there are positions available on the cycloaliphatic radical for substitution. Substituents which may be present on a cycloaliphatic radical include but are not limited to halogen atoms such as fluorine, chlorine, bromine, and iodine. Substituted cycloaliphatic radicals include trifluoromethylcyclohexyl, hexafluoroisopropylidenebis(4-cyclohexyloxy) (i.e. —OC$_6$H$_{11}$C(CF$_3$)$_2$C$_6$H$_{11}$O—), chloromethylcyclohexyl; 3-trifluorovinyl-2-cyclopropyl; 3-trichloromethykyclohexyl (i.e. 3-CCl$_3$C$_6$H$_{11}$—), bromopropylcyclohexyl (i.e. BrCH$_2$CH$_2$CH$_2$C$_6$H$_{11}$—), and the like. For convenience, the term "unsubstituted cycloaliphatic radical" is defined herein to encompass a wide range of functional groups. Examples of unsubstituted cycloaliphatic radicals include 4-allyloxycyclohexyl, aminocyclohexyl (i.e. H$_2$N C$_6$H$_{11}$—), aminocarbonylcyclopenyl (i.e. NH$_2$COC$_5$H$_9$—), 4-acetyloxycyclohexyl, dicyanoisopropylidenebis(4-cyclohexyloxy) (i.e. —OC$_6$H$_{11}$C(CN)$_2$C$_6$H$_{11}$O—), 3-methylcyclohexyl, methylenebis(4-cyclohexyloxy) (i.e. —OC$_6$H$_{11}$CH$_2$C$_6$H$_{11}$O—), ethylcyclobutyl, cyclopropylethenyl, 3-formyl-2-terahydrofuranyl, 2-hexyl-5-tetrahydrofuranyl; hexamethylene-1,6-bis(4-cyclohexyloxy) (i.e. —OC$_6$H$_{11}$(CH$_2$)$_6$ C$_6$H$_{11}$O—); 4-hydroxymethylcyclohexyl (i.e. 4-HOCH$_2$C$_6$H$_{11}$—), 4-mercaptomethylcyclohexyl (i.e. 4-HSCH$_2$C$_6$H$_{11}$—), 4-methylthiocyclohexyl (i.e. 4-CH$_3$SC$_6$H$_{11}$—), 4-methoxycyclohexyl, 2-methoxycarbonykyclohexyloxy (2-CH$_3$OCOC$_6$H$_{11}$O—), nitromethylcyclohexyl (i.e. NO$_2$CH$_2$C$_6$H$_{10}$—), trimethylsilylcyclohexyl, t-butyldimethylsilylcyclopentyl, 4-trimethoxysilyethykyclohexyl (e.g. (CH$_3$O)$_3$SiCH$_2$CH$_2$C$_6$H$_{10}$—), vinylcyclohexenyl, vinylidenebis(cyclohexyl), and the like. The term "a C$_3$-C$_{10}$ cycloaliphatic radical" includes substituted cycloaliphatic radicals and unsubstituted cycloaliphatic radicals containing at least three but no more than 10 carbon atoms. The cycloaliphatic radical 2-tetrahydrofuranyl (C$_4$H$_7$O—) represents a C$_4$ cycloaliphatic radical. The cyclohexylmethyl radical (C$_6$H$_{11}$CH$_2$—) represents a C$_7$ cycloaliphatic radical.

In one aspect, the present invention relates to polyethersulfones having Tg greater than about 235° C. and a notched Izod value greater than about 1 ft-lb/in, and to articles composed thereof. The polyethersulfones include from about 5 mol % to less than about 40 mol % structural units of formula 1 and from greater than about 60 mol % to about 95 mol % structural units of formula 2; particularly from about 10 mol % to about 40 mol % structural units of formula 1 and from about 60 mol % to about 90 mol % structural units of formula 2; and more particularly from about 10 mol % to about 30 mol % structural units of formula 1 and from about 70 mol % to about 90 mol % structural units of formula 2

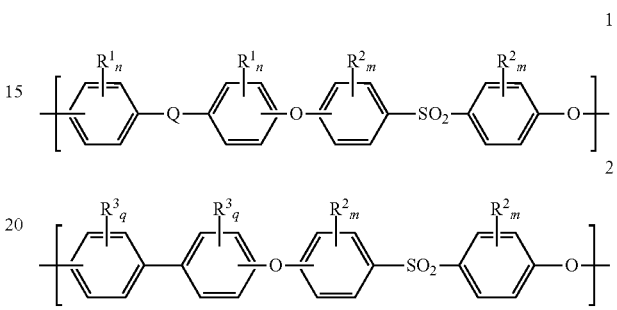

wherein
R$^1$, R$^2$, and R$^3$ are independently at each occurrence a halogen atom, a nitro group, a cyano group, a C$_1$-C$_{12}$ aliphatic radical, C$_3$-C$_{12}$ cycloaliphatic radical, or a C$_3$-C$_{12}$ aromatic radical;
n, m, q are independently at each occurrence integers from 0 to 4; and
Q is a C$_3$-C$_{20}$ cycloaliphatic radical, or a C$_3$-C$_{20}$ aromatic radical.

In particular embodiments, Q may be selected from the group consisting of

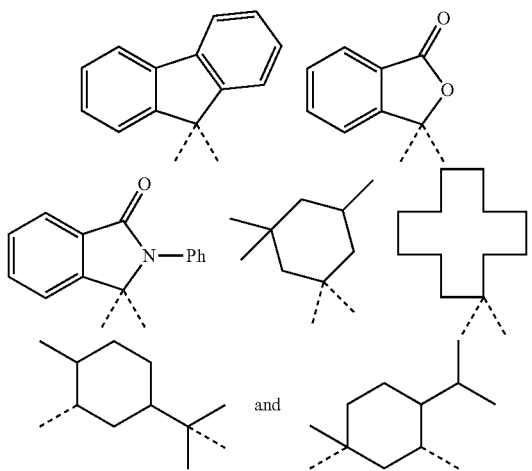

and

More particularly, Q may be

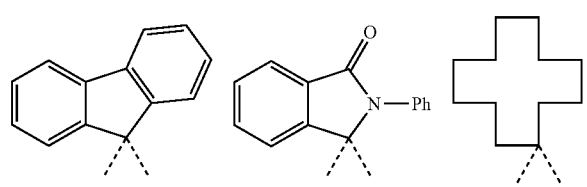

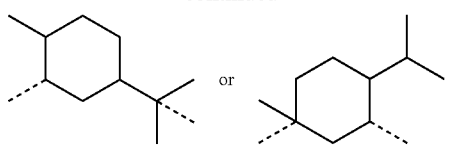

In specific embodiments, Q may be

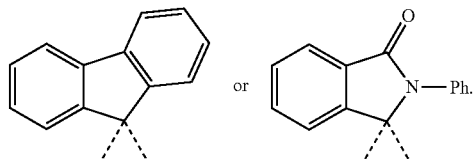

In other embodiments, the polyethersulfones consist of from about 10 mol % to about 40 mol % structural units of formula 1A and from greater than about 60 mol % to about 90 mol % structural units of formula 2, particularly from about 10 mol % to about 30 mol % structural units of formula 1A and from about 70 mol % to about 90 mol % structural units of formula 2; and more particularly from about 15 mol % to about 30 mol % structural units of formula 1A and from about 70 mol % to about 95 mol % structural units of formula 2.

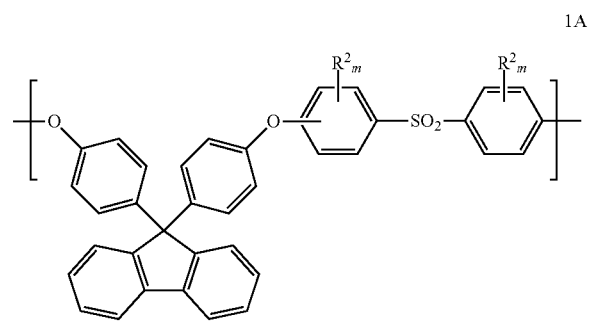

1A

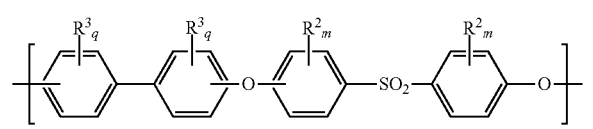

2

It should be noted that in the context of the present invention, the term 'structural units' refers to internal repeat units, exclusive of end groups, and when a polyethersulfone is described as 'consisting of' particular 'structural units', other units, especially end units, may be present in the polymer.

In particular, the polyethersulfones may consist of from about 10 mol % to about 35 mol % structural units of formula 1A1 and from greater than about 65 mol % to about 90 mol % structural units of formula 2B.

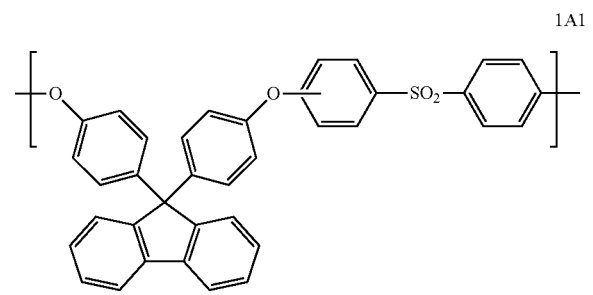

1A1

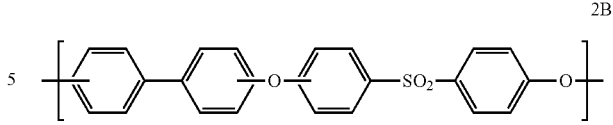

2B

In yet other embodiments, the polyethersulfones consist of from about 5 mol % to about 25 mol % structural units of formula 1B and from greater than about 75 mol % to about 95 mol % structural units of formula 2, and particularly from about 5 mol % to about 15 mol % structural units of formula 1A and from about 85 mol % to about 95 mol % structural units of formula 2

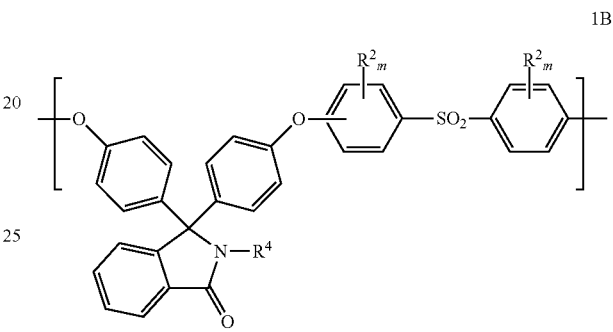

1B

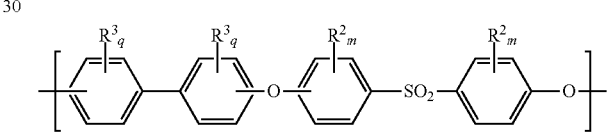

2 wherein $R^2$, $R^3$, n, m, and q are as defined above and $R^4$ is $C_1$-$C_{20}$ aliphatic radical, a $C_3$-$C_{20}$ cycloaliphatic radical, or a $C_3$-$C_{20}$ aromatic radical.

In particular, the polyethersulfones may consist of from about 5 mol % to about 25 mol % structural units of formula 1B1 and from greater than about 75 mol % to about 95 mol % structural units of formula 2B.

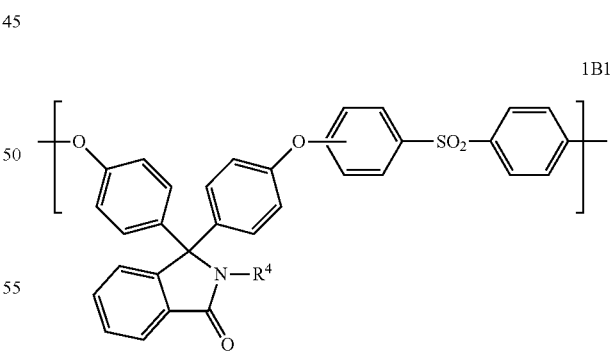

1B1

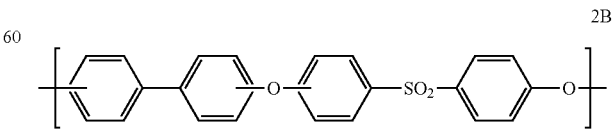

2B

As noted, the present invention provides polyethersulfones comprising structural units I

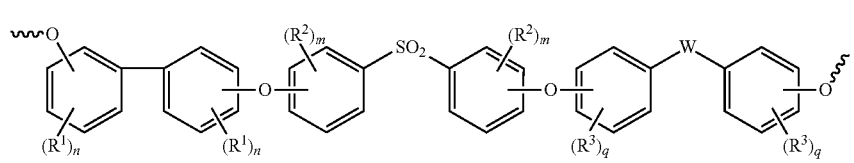

I wherein $R^1$, $R^2$, and $R^3$ are independently at each occurrence a halogen atom, a nitro group, a cyano group, a $C_1$-$C_{12}$ aliphatic radical, $C_3$-$C_{12}$ cycloaliphatic radical, or a $C_3$-$C_{12}$ aromatic radical; n, m, q are independently at each occurrence integers from 0 to 4; W is a $C_3$-$C_{20}$ cycloaliphatic radical or a $C_3$-$C_{20}$ aromatic radical; and wherein said composition comprises greater than 5 mole percent aromatic ether structural units derived from at least one bisphenol having structure II

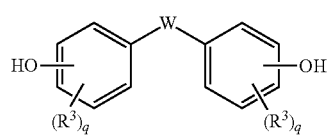

II wherein $R^3$ is independently at each occurrence a halogen atom, a nitro group, a cyano group, a $C_1$-$C_{12}$ aliphatic radical, $C_3$-$C_{12}$ cycloaliphatic radical, or a $C_3$-$C_{12}$ aromatic radical; q is independently at each occurrence an integer from 0 to 4; W is a $C_3$-$C_{20}$ cycloaliphatic radical or a $C_3$-$C_{20}$ aromatic radical. Those skilled in the art will understand that the term "polyethersulfones comprising structural units I" refers to polyethersulfones comprising the structural units shown in structure I, and that the term is not intended to suggest that the polyethersulfone comprises "repeat units" having structure I.

Suitable bisphenols having structure II include bisphenols having structures III-IX.

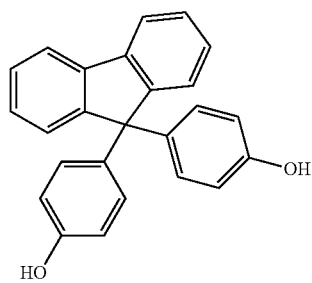

III

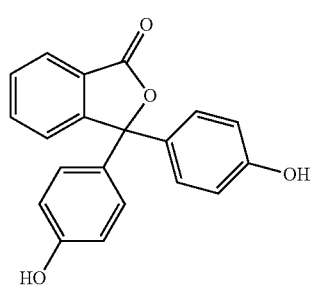

IV

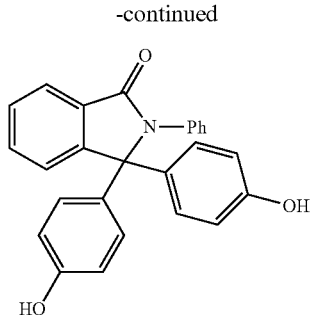

V

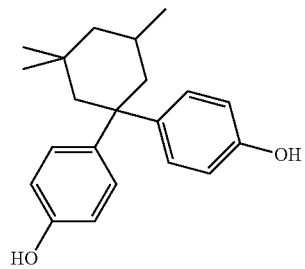

VI

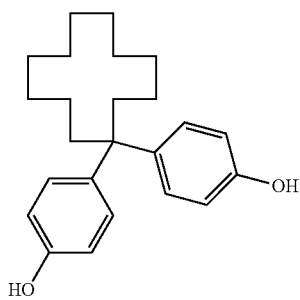

VII

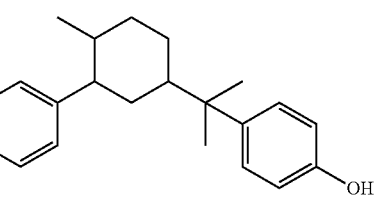

VIII

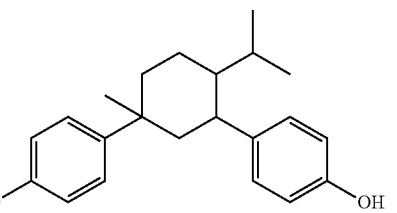

IX

Bisphenols III-IX and like bisphenols are available commercially or may be prepared using methods well known to those skilled in the art.

In one embodiment, the polyethersulfone comprises structural units derived from at least bisphenol having structure X

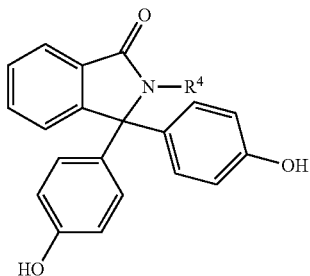

X wherein R⁴ is $C_1$-$C_{20}$ aliphatic radical, a $C_3$-$C_{20}$ cycloaliphatic radical, or an $C_3$-$C_{20}$ aromatic radical. Bisphenols having structure X are illustrated by 2,3-dihydro-3,3-bis(4-hydroxyphenyl)-2-methyl-1H-isoindol-1-one (CAS No. 22749-77-5); 2,3-dihydro-3,3-bis(4-hydroxyphenyl)-2-cyclohexyl-1H-isoindol-1-one; 2,3-dihydro-3,3-bis(4-hydroxyphenyl)-2-phenyl-1H-isoindol-1-one; 2,3-dihydro-3,3-bis(4-hydroxyphenyl)-2-(4-fluorophenyl)-1H-isoindol-1-one; and the like.

In one embodiment, the present invention provides polyethersulfones I comprising at least one structural unit derived from a bisphenol selected from the group consisting of bisphenols III and V.

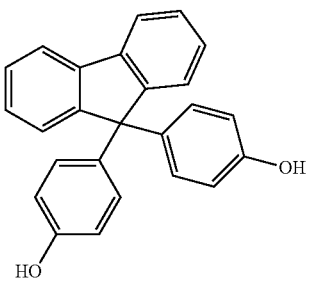

III

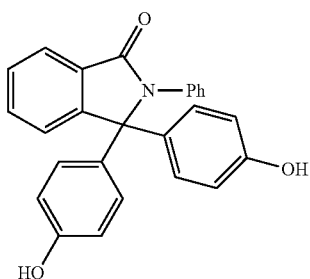

V

The polyethersulfones I of the present invention comprise structural units derived from at least one biphenol XI

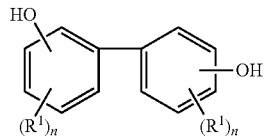

XI wherein R¹ is defined as in structure I and is independently at each occurrence a halogen atom, a nitro group, a cyano group, a $C_1$-$C_{12}$ aliphatic radical, $C_3$-$C_{12}$ cycloaliphatic radical, or a $C_3$-$C_{12}$ aromatic radical; and n is independently at each occurrence an integer from 0 to 4.

Bisphenols XI are commercially available or may be prepared by methods known to those skilled in the art. The biphenol, 4,4'-dihydroxybiphenyl, is a preferred biphenol and is available commercially from ALDRICH Chemical Co.

Preferred polyethersulfone compositions provided by the present invention typically comprise structural units derived from 4,4'-biphenol in an amount corresponding to from about 5 mole percent to about 95 mole percent of a total amount of aromatic ether structural units present in the composition, more preferably from about 35 mole percent to about 95 mole percent, and even more preferably from about 50 mole percent to about 95 mole percent.

The polyethersulfone compositions of the present invention exhibit high glass transition temperatures, making them useful materials for applications requiring resistance to heat. Typically, the polyethersulfone compositions of the present invention exhibit glass transition temperatures of greater than about 225° C., more preferably greater than about 235° C., and even more preferably greater than about 250° C.

The polyethersulfone compositions of the present invention exhibit excellent impact resistance (i.e. Notched Izod test value of greater than 1 ft-lb/in). The impact resistance of a polymeric material is conveniently determined using American Standard Test Method D256 (ASTM D256). Typically the polyethersulfone compositions of the present invention exhibit Notched Izod test values greater than 1 ft-lb/in, preferably greater than 3 ft-lb/in, and still more preferably greater than 8 ft-lb/in as measured using ASTM D256.

As noted, the polyethersulfone compositions of the present invention exhibit excellent impact resistance (i.e. Notched Izod test value of greater than 1 ft-lb/in). Impact resistance is dependent upon molecular weight. In one embodiment the polyethersulfone composition of the present invention has a weight average ($M_w$) molecular weight in excess of 45,000 grams per mole as measured by gel permeation chromatography using polystyrene molecular weight standards in chloroform mobile phase. In another embodiment the polyethersulfone composition of the present invention has a weight average ($M_w$) molecular weight in excess of 55,000 grams per mole as measured by gel permeation chromatography using polystyrene molecular weight standards.

In one embodiment the present invention provides a polyethersulfone composition comprising structural units XII

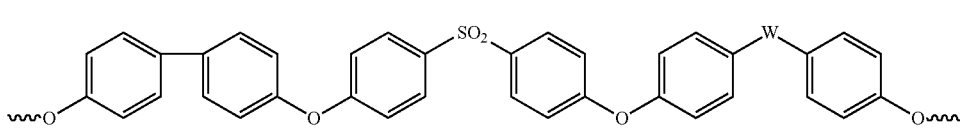

XII wherein W is a $C_3$-$C_{20}$ cycloaliphatic radical or a $C_3$-$C_{20}$ aromatic radical; and wherein said composition comprises greater than 5 mole percent aromatic ether structural units derived from at least one bisphenol having structure XIII

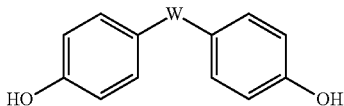

XIII wherein W is a $C_3$-$C_{20}$ cycloaliphatic radical or a $C_3$-$C_{20}$ aromatic radical.

Suitable bisphenols XIII include bisphenols having structures III-IX.

In one embodiment, the present invention provides polyethersulfones XII comprising at least one structural unit derived from a bisphenol selected from the group consisting of bisphenols III and V.

In one embodiment, the present invention provides polyethersulfones I wherein said composition comprises greater than 5 mole percent aromatic ether structural units derived from at least one bisphenol having structure II wherein W is a divalent cycloaliphatic or a divalent aromatic radical selected from the group consisting of structures XIV-XVIII.

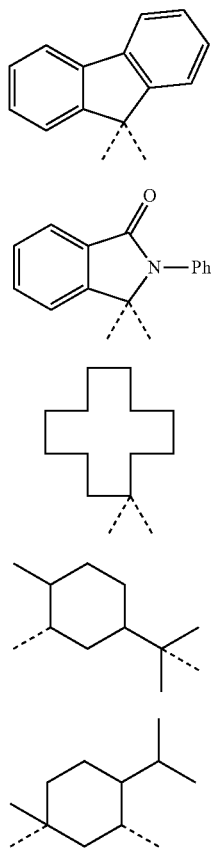

XIV

XV

XVI

XVII

XVIII

In structures XIV-XVIII the dashed lines indicate the points of attachment of the divalent radicals to the hydroxyphenylene groups of the bisphenol II.

In a particular embodiment of the present invention polyethersulfone I comprises structural units derived from monomer mixture comprising fluorenylidene bisphenol-A (FBPA) (Structure III), 4,4'-biphenol and at least one dihalodiarylsulfone monomer. The monomer mixture comprising fluorenylidene bisphenol-A monomer III and 4,4'-biphenol monomer is referred to herein as "a mixture of diphenolic monomers".

In one particular embodiment, the polyethersulfones of the invention comprise structural units derived from a mixture of diphenolic monomers comprising at least 50 mole percent of 4,4'-biphenol and an amount of fluorenylidene bisphenol-A corresponding to less than or equal to 50 mole percent, based on the total moles of diphenolic monomers. In other embodiments the polyethersulfones comprise structural units derived from a mixture of diphenolic monomers comprising at least 70 mole percent of 4,4'-biphenol based on total moles of diphenolic monomers. In still other embodiments the polyethersulfones comprise structural units derived from a mixture of diphenolic monomers comprising 50-95 mole percent, preferably 60-95 mole percent or 65-85 mole percent or 70-85 mole percent of 4,4'-biphenol based on total moles of diphenolic monomers.

In one embodiment, the polyethersulfones of the present invention comprise, in addition to structural units derived from 4,4'-biphenol and fluorenylidene bisphenol-A monomers, at least one additional dihydroxybiphenyl monomer. The additional dihydroxybiphenyl monomer may be any dihydroxybiphenyl other than 4,4'-biphenol including, but are not limited to, substituted derivatives of 4,4'-biphenol. Suitable substituents on one or more of the aromatic rings of the additional dihydroxybiphenyl monomers comprise iodo, bromo, chloro, fluoro, alkyl, particularly $C_1$-$C_{10}$ alkyl, allyl, alkenyl, alkyl ether, cyano and the like. Additional biphenol monomers may be either symmetrical or unsymmetrical.

In an alternate embodiment, the polyethersulfones of the present invention comprise, in addition to structural units derived from 4,4'-biphenol and fluorenylidene bisphenol-A monomers, at least one additional bisphenol monomer represented by the formula (II).

Aromatic polyethersulfones are known (for example GB Patent 1,078,234, U.S. Pat. No. 4,010,147). They may be prepared, for example, by the reaction of dialkali metal salts of diphenols with dihalodiarylsulfones in a solvent. The dialkali salts of diphenols may also be produced in situ or may be produced in a separate reaction. The solvent is preferably an aromatic solvent such as dichlorobenzene (o-DCB), chlorobenzene, xylene, toluene, mesitylene; or a polar aprotic solvent such as N—$C_1$-$C_5$-alkyl caprolactam (for example N-methyl caprolactam, N-ethyl caprolactam, N-n-propyl caprolactam, N-isopropyl caprolactam), N—$C_1$-$C_5$-alkyl pyrrolidones (for example N-methylpyrrolidone), N,N-dimethyl formamide, N,N-dimethyl acetamide, dimethyl sulfoxide, diphenyl sulfone, sulfolane, tetramethyl urea and mixtures thereof. When the solvent employed is a relatively nonpolar solvent such as dichlorobenzene, chlorobenzene, xylene, toluene, or mesitylene, at least one phase transfer catalysts may be employed in order to achieve synthetically useful reaction rates. Suitable phase transfer catalysts include hexaalkylguanidinium chlorides, p-dialkylaminopyridinium salts, bis-guanidinium salts, bis-dialkylaminopyridinium salts, tetraalkylphosphonium salts, and mixtures thereof. When a polar aprotic solvent is employed the use of the phase transfer catalyst may be optional.

The aromatic polyethersulfones of the present invention are typically prepared at temperatures in the range of 130° C. to 320° C., and preferably at temperatures in the range from 145° C. to 280° C., under pressures of from 0.8 to 10 bar, and still more preferably under pressures of from 1 to 3 bar, most preferably at atmospheric pressure.

The quantity of solvent employed is typically from about 0.5 to about 50 parts by weight and preferably from 5 to 35 parts by weight, based on the total weight of polymer produced.

The polyether sulfones provided by the present invention may be recovered using conventional techniques.

The polyethersulfones according to the invention are thermoplastics combining high heat resistance with excellent impact resistance and superior flame resistance. They may be processed, for example, by extrusion, injection molding, sintering or press molding.

Moldings of any type may be produced. These moldings may be used for any applications requiring polyethersulfones of high dimensional stability and excellent impact resistance i.e. for example in printing circuit boards, aircraft construction, ovenware for microwave ovens, sterilizable medical instruments, parts of coffee machines, egg boilers, hotwater tanks, pipes and pumps, hair dryers and the like. However, the polyethersulfones according to the invention are particularly suitable for films and membranes which are required to show a high heat resistance, high flame resistance and impact resistance.

Standard additives may be added to the polyethersulfones of the present invention to the invention, preferably in quantities of from about 0.00001 to about 80% by weight and more preferably in quantities of from about 0 to about 60% by weight, based on the weight of the polyethersulfone present in the composition comprising the additive. These additives include such materials as thermal stabilizers, antioxidants, UV stabilizers, plasticizers, visual effect enhancers, extenders, antistatic agents, catalyst quenchers, mold releasing agents, fire retardants, blowing agents, impact modifiers and processing aids. The different additives that can be incorporated into the polyethersulfones of the present invention are typically commonly used in resin compounding and are known to those skilled in the art.

Visual effect enhancers, sometimes known as visual effects additives or pigments may be present in an encapsulated form, a non-encapsulated form, or laminated to a particle comprising polymeric resin. Some non-limiting examples of visual effects additives are aluminum, gold, silver, copper, nickel, titanium, stainless steel, nickel sulfide, cobalt sulfide, manganese sulfide, metal oxides, white mica, black mica, pearl mica, synthetic mica, mica coated with titanium dioxide, metal-coated glass flakes, and colorants, including but not limited, to Perylene Red. The visual effect additive may have a high or low aspect ratio and may comprise greater than 1 facet. Dyes may be employed such as Solvent Blue 35, Solvent Blue 36, Disperse Violet 26, Solvent Green 3, Anaplast Orange LFP, Perylene Red, and Morplas Red 36. Fluorescent dyes may also be employed including, but not limited to, Permanent Pink R (Color Index Pigment Red 181, from Clariant Corporation), Hostasol Red 5B (Color Index #73300, CAS #522-75-8, from Clariant Corporation) and Macrolex Fluorescent Yellow 10GN (Color Index Solvent Yellow 160:1, from Bayer Corporation). Pigments such as titanium dioxide, zinc sulfide, carbon black, cobalt chromate, cobalt titanate, cadmium sulfides, iron oxide, sodium aluminum sulfosilicate, sodium sulfosilicate, chrome antimony titanium rutile, nickel antimony titanium rutile, and zinc oxide may be employed. Visual effect additives in encapsulated form usually comprise a visual effect material such as a high aspect ratio material like aluminum flakes encapsulated by a polymer. The encapsulated visual effect additive has the shape of a bead.

Non-limiting examples of antioxidants include tris(2,4-di-tert-butylphenyl)phosphite; 3,9-di(2,4-di-tert-butylphenoxy)-2,4,8,10-tetraoxa-3,9-diphosphaspiro[5.5]undecane; 3,9-di(2,4-dicumylphenoxy)-2,4,8,10-tetraoxa-3,9-diphosphaspiro[5.5]undecane; tris(p-nonylphenyl)phosphite; 2,2',2"-nitrilo[triethyl-tris[3,3',5,5'-tetra-tertbutyl-1,1'-biphenyl-2'-diyl]phosphite]; 3,9-distearyloxy-2,4,8,10-tetraoxa-3,9-diphosphaspiro[5.5]undecane; dilauryl phosphite; 3,9-di[2,6-di-tert-butyl-4-methylphenoxy]-2,4,8,10-tetraoxa-3,9-diphosphaspiro[5.5]undecane; tetrakis(2,4-di-tert-butylphenyl)-4,4'-bis(diphenylene)phosphonite; distearyl pentaerythritol diphosphite; diisodecyl pentaerythritol diphosphite; 2,4,6-tri-tert-butylphenyl-2-butyl-2-ethyl-1,3-propanediol phosphite; tristearyl sorbitol triphosphite; tetrakis(2,4-di-tert-butylphenyl)-4,4'-biphenylene diphosphonite; (2,4,6-tri-tert-butylphenyl)-2-butyl-2-ethyl-1,3-propanediol phosphite; triisodecylphosphite; and mixtures of phosphites containing at least one of the foregoing. Tris(2,4-di-tert-butylphenyl) phosphite; 2,4,6-tri-tert-butylphenyl-2-butyl-2-ethyl-1,3-propanediol phosphite; bis(2,4-di-tert-butylphenyl)pentaerythritol diphosphite are especially preferred, as well as mixtures of phosphites containing at least one of the foregoing phosphites, and the like.

The polyethersulfones of the present invention may optionally comprise an impact modifier. The impact modifier resin may be added to the polyethersulfone in an amount corresponding to about 1% to about 30% by weight, based on the total weight of the composition. Suitable impact modifiers include those comprising one of several different rubbery modifiers such as graft or core shell rubbers or combinations of two or more of these modifiers. Impact modifiers are illustrated by acrylic rubber, ASA rubber, diene rubber, organosiloxane rubber, ethylene propylene diene monomer (EPDM) rubber, styrene-butadiene-styrene (SBS) rubber, styrene-ethylene-butadiene-styrene (SEBS) rubber, acrylonitrile-butadiene-styrene (ABS) rubber, methacrylate-butadiene-styrene (MBS) rubber, styrene acrylonitrile copolymer and glycidyl ester impact modifier.

Non-limiting examples of processing aids include, Doverlube® FL-599 (available from Dover Chemical Corporation), Polyoxyter® (available from Polychem Alloy Inc.), Glycolube P (available from Lonza Chemical Company), pentaerythritol tetrastearate, Metablen A-3000 (available from Mitsubishi Rayon), neopentyl glycol dibenzoate, and the like.

Non-limiting examples of UV stabilizers include 2-(2'-Hydroxyphenyl)-benzotriazoles, e.g., the 5'-methyl-; 3',5'-di-tert.-butyl-; 5'-tert.-butyl-; 5'-(1,1,3,3-tetramethylbutyl)-; 5-chloro-3',5'-di-tert.-butyl-; 5-chloro-3'-tert.-butyl-5'-methyl-; 3'-sec.-butyl-5'-tert.-butyl-; 3'-alpha-methylbenzyl-5'-methyl; 3'-alpha-methylbenzyl-5'-methyl-5-chloro-; 4'-hydroxy-; 4'-methoxy-; 4'-octoxy-; 3',5'-di-tert.-amyl-; 3'-methyl-5'-carbomethoxyethyl-; 5-chloro-3',5'-di-tert.-amyl-derivatives; and Tinuvin® 234 (available from Ciba Specialty Chemicals). Also suitable are the 2,4-bis-(2'-hydroxyphenyl)-6-alkyl-s-triazines, e.g., the 6-ethyl-; 6-heptadecyl- or 6-undecyl-derivatives. 2-Hydroxybenzophenones e.g., the 4-hydroxy-; 4-methoxy-; 4-octoxy-; 4-decyloxy-; 4-dodecyloxy-; 4-benzyloxy-; 4,2',4'-trihydroxy-; 2,2',4,4'-tetrahydroxy- or 2'-hydroxy-4,4'-dimethoxy-derivative. 1,3-bis-(2'-Hydroxybenzoyl)-benzenes, e.g., 1,3-bis-(2'-hydroxy-4'-hexyloxy-benzoyl)-benzene; 1,3-bis-(2'-hydroxy-4'-octyloxy-benzoyl)-benzene or 1,3-bis-(2'-hydroxy-4'-dodecyloxybenzoyl)-benzene may also be employed. Esters of optionally substituted benzoic acids, e.g., phenylsalicylate; octylphenylsalicylate; dibenzoylresorcin; bis-(4-tert.-butylbenzoyl)-resorcin; benzoylresorcin; 3,5-di-tert.-butyl-4-hydroxybenzoic acid-2,4-di-tert.-butylphenyl ester or -octadecyl ester or -2-methyl-4,6-di-tert.-butyl ester may likewise be employed. Acrylates, e.g., alpha-cyano-beta, beta-diphenylacrylic acid-ethyl ester or isooctyl ester, alpha-carbomethoxy-cinnamic acid methyl ester, alpha-cyano-beta-methyl-p-methoxy-cinnamic acid methyl ester or -butyl ester or N(beta-carbomethoxyvinyl)-2-methyl-indoline may likewise be employed. Oxalic acid diamides, e.g., 4,4'-di-octyloxy-oxanilide; 2,2'-di-octyloxy-5,5'-di-tert.-butyl-oxanilide; 2,2'-di-dodecyloxy-5,5-di-tert.-butyl-oxanilide; 2-ethoxy-2'-ethyl-oxanilide; N,N'-bis-(3-dimethyl-aminopropyl)-oxalamide; 2-ethoxy-5-tert.-butyl-2'-ethyloxanilide and the mixture thereof with 2-ethoxy-2'-ethyl-5,4'-di-tert.-butyl-oxanilide; or mixtures of ortho- and para-methoxy- as well as of o- and p-ethoxy-disubstituted oxanilides are also suitable as UV stabilizers. Preferably the ultraviolet light absorber used in the instant compositions is 2-(2-hydroxy-5-methylphenyl)-2H-benzotriazole; 2-(2-hydroxy-3,5-di-tert-amylphenyl)-2H-benzotriazole; 2-[2-hydroxy-3,5-di-(alpha, alpha-dimethylbenzyl)phenyl]-2H-benzotriazole; 2-(2-hydroxy-5-tert-octylphenyl)-2H-benzotriazole; 2-hydroxy-4-octyloxybenzophenone; nickel bis(O-ethyl 3,5-di-tert-butyl-4-hydroxybenzylphosphonate); 2,4-dihydroxybenzophenone; 2-(2-hydroxy-3-tert-butyl-5-methylphenyl)-2H-benzotriazole; nickel butylamine complex with 2,2'-thiobis(4-tert-butylphenol); 2-ethoxy-2'-ethyloxanilide; 2-ethoxy-2'-ethyl-5,5'-ditert-butyloxanilide or a mixture thereof.

Non-limiting examples of fire retardants include potassium nonafluorobutylsulfonate, potassium diphenylsulfone sulfonate, and phosphite esters of polyhydric phenols, such as resorcinol and bisphenol A.

Non-limiting examples of mold release compositions include esters of long-chain aliphatic acids and alcohols such as pentaerythritol, guerbet alcohols, long-chain ketones, siloxanes, alpha.-olefin polymers, long-chain alkanes and hydrocarbons having 15 to 600 carbon atoms.

The polyethersulfones according to the invention may also be mixed in known manner with other known polymers to form for example, polymer blends, polymer mixtures, and polymer alloys.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in ° C. Notched Izod values were determined to assess impact resistance and were measured according to the ASTM D256 standard method.

Molecular weights are reported as number average ($M_n$) or weight average ($M_w$) molecular weight and were determined by gel permeation chromatography (GPC) analysis, using polystyrene molecular weight standards to construct a broad standard calibration curve against which polymer molecular weights were determined The temperature of the gel permeation columns was 40° C. and the mobile phase was chloroform with 3.75% v/v isopropyl alcohol.

In the following examples, values for glass transition temperature were determined by differential scanning calorimetry (DSC) at a heating rate of 20° C. per minute.

Example 1

250 mL-SCALE FBPA/BP COPOLYMERIZATION (30/70 COMPOSITION): Synthesis of the disodium salt of fluorenylidene bisphenol A (FBPA): Under an Argon atmosphere 9,9-bis(4-hydroxyphenyl)fluorene (fluorenylidene bisphenol A (FBPA)) (50.6318 g, 0.14449 mol) was dissolved in Argon-degassed methanol (MeOH) (120 mL). To the slightly yellow solution an aqueous (50.55%) sodium hydroxide solution (22.8659 g, 0.28899 mol) was added dropwise at room temperature. The color of the solution changed slightly to orange and precipitation occurred. Addition of 60 mL more of MeOH redissolved the precipitate. The resulting yellow-orange solution was transferred by means of a peristaltic pump at a constant flow rate of 2 mL/min to another reactor, which contained mechanically stirred, hot (170° C.) 1,2-dichlorobenzene (o-DCB) (150 mL). By means of a short-path distillation head the MeOH/water mixture was distilled off. When around 190 mL were distilled off the temperature was raised to 210° C. Later, 50 mL of o-DCB were added and the temperature was raised to 225° C. Distillation was continued until the water content of the distillate was determined to be 20 ppm. Then, the mixture was diluted with dry o-DCB (50 mL) and cooled to room temperature under Argon. The resulting suspension was filtered under nitrogen. The filter cake was washed with Argon-degassed heptane. The off-white powder was dried at 130° C. under vacuum for 2 days to give 52 g (91%) of the disodium salt of FBPA (FBPA $Na_2$-salt). The salt was used directly for polymerization.

Polymerization: The disodium salt of fluorenylidene bisphenol A (FBPANa$_2$) (10.2065 g, 25.8799 mmol) and the disodium salt of biphenol (BPNa$_2$) (13.9275 g, 60.5086 mmol) were weighed into a reaction flask under nitrogen atmosphere and suspended in o-dichlorobenzene (o-DCB) (100 mL). Some o-DCB (~33 g) was distilled out via a short path distillation head to dry the mixture, then dichlorodiphenylsulfone (DCDPS) (24.8075 g, 86.3874 mmol) and dry o-DCB (33 g) were added. Again, o-DCB (38 g) was distilled out to dry the mixture. The water content of the distillate was determined by Karl Fischer titration to be between 10 and 20 ppm. Hexaethylguanidinium chloride (HEGCl) (3.6 ml at 0.96 Min o-DCB) was added at 180° C. and the polymerization was started. Aliquots were withdrawn to monitor the molecular weight of the polymer. When the target molecular weight was achieved, the brown honey-colored solution was quenched at 180° C. with 10 drops of $H_3PO_4$ (85%). After 15 min, o-DCB (155 mL) was added to dilute the quenched product mixture to about 10% solids.

Work-up procedure A: The mixture was cooled to 85° C. and while being stirred at 350 rpm, 1.7 mL of water was added to agglomerate the sodium chloride. The mixture was then heated to 120° C. to boil off the water. When the bubbling stopped the mixture was filtered hot through densely packed Celite (~3-5 mm thick). The resulting clear polymer solution was cooled to room temperature—, precipitated into MeOH using a blender, filtered, and oven dried to afford the product copolymer as an off-white fluffy powder (30.2 g, 78%). The latter was redissolved in chloroform (190 mL) and precipitated in MeOH.

Work-up Procedure B: In an alternate procedure, the catalyst was removed by direct precipitation into a nonsolvent such as methanol without the addition of the 1.7 mL of water. After direct precipitation the remaining steps described in Work-up Procedure A were carried out to afford the product polymer.

Work-up Procedure C: In another alternative procedure, the catalyst was removed by adsorption using silica gel. The remaining steps described in Work-up Procedure A were carried out to afford the product polymer.

Analysis: Differential scanning calorimetry of the product polymer showed a single glass transition temperature at 240° C.

Example 2

5 L-SCALE FBPA/BP COPOLYMERIZATION (30/70 COMPOSITION): Mixed salt synthesis: In a magnetically stirred 2000 mL 3-neck round-bottom flask equipped with a 250 mL addition funnel, FBPA (79.9672 g, 0.22821 mol) was dissolved in Argon-degassed MeOH (400 mL). Under an inert atmosphere biphenol (99.1534 g, 0.53248 mol) was added followed by additional MeOH (350 mL). Aqueous sodium hydroxide (123.5549 g at 49.25 wt %, 1.52138 mol) was added dropwise using an addition funnel to the slurry and rinsed-in with MeOH (30 mL). The resulting reddish-orange solution was transferred by means of a peristaltic pump at ~6 mL/min into mechanically stirred (200 rpm) hot (165° C.) o-DCB (1480 mL). The addition was complete after around 135 minutes and at this point about 880 mL of solvents (MeOH/water/o-DCB) had been distilled off. The distillation was continued at 185-190° C. until all of the water was distilled off. Distillation of o-DCB was continued until about 200 mL of clear o-DCB were removed. The water content of the last fraction was determined to be 17 ppm. The color of the mixed salt slurry in o-DCB was almost white.

Polymerization: To the white slurry of the FBPANa$_2$ and the BPNa$_2$ in o-DCB, was added DCDPS (220.62 g, 0.76827 mol) followed by additional o-DCB (100 mL). The mixture was heated and o-DCB (940 mL) was distilled off until the solids content was about 29% (29.2%). When about 840 mL of o-DCB had been distilled off the water content of the distillate was determined to be 9 ppm. The catalyst (32 mL at 0.96 M) was then added to the reaction mixture at a pot temperature 185° C. A vigorous reflux was observed. The polymerization was allowed to proceed. After the final molecular weight was reached, the solution was quenched at 180° C. with phosphoric acid (7.1 g of 85% H$_3$PO$_4$). After 13 more minutes the mixture was diluted with o-DCB (1735 mL) to 10% solids. The solution was brought to 90° C. and water (11 mL) was added while stirring at 350 rpm. Salt crystals were observed to form in less than a minute. After 15 minutes, the suspension was heated to 135° C. to boil off the water. Then, the hot mixture was drained and filtered through a suitable filtration device. The filtration took less than 15 minutes. The clear solution was cooled to ambient temperature and some precipitation occurred. The mixture was heated to 90° C. and the resultant solution was precipitated into MeOH. The fluffy product polymer was dissolved in chloroform (10% solids) and precipitated in MeOH to yield 315 g (92%) of final product polymer as a fluffy solid. DSC: One $T_g$ at 243° C. Notched Izod impact testing (ASTM D 256) was carried out on ten molded test parts and showed an average value of 3.19 ft-lb/in and a standard deviation of 0.48 ft-lb/in.

Example 3

5 L-SCALE FBPA/BP COPOLYMERIZATION (50/50 COMPOSITION): This composition was synthesized described in Example 2. The product polymer exhibited a single glass transition temperature(Tg) at 253.7° C. Notched Izod impact testing (ASTM D 256) was carried out on ten molded test parts and showed an average value of 1.16 ft-lb/in and a standard deviation of 0.48 ft-lb/in.

Example 4

5 L-SCALE FBPA/BP COPOLYMERIZATION (15/85 COMPOSITION): This composition was synthesized described in Example 2. The product polymer exhibited a single glass transition temperature ($T_g$) at 234.8° C. Notched Izod impact testing (ASTM D 256) was carried out on ten molded test parts and showed an average value of 8.44 ft-lb/in and a standard deviation of 1.63 ft-lb/in.

The data presented in Examples 1-4 illustrate a surprising combination of very high Tg together with excellent ductility characteristics (Notched Izod above 1 ft-lb/in.) among compositions of the present invention. The glass transition temperature and Notched Izod data for the polyethersulfone compositions of Examples 1-4 are shown graphically in FIG. 1. In FIG. 1, 10 shows the correlation between the concentration of FBPA in the copolymer and the glass transition temperature of the copolymer. In FIG. 1, 20 shows the correlation between the concentration of FBPA in the copolymer and the Notched Izod value of the copolymer. It should be noted that as the concentration of FBPA-derived structural units increases relative to the concentration of biphenol-derived structural units, the Notched Izod value observed for the composition decreases (FIG. 1). See Example 3 (50% FBPA polysulfone) which exhibited very poor performance in Notched Izod testing. A second set of data is presented in FIG. 2, illustrating properties of copolymers of bis(4-chlorophenyl)sulfone, biphenol and PPPBP.

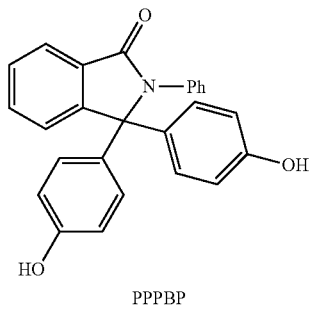

PPPBP

Figure 2:
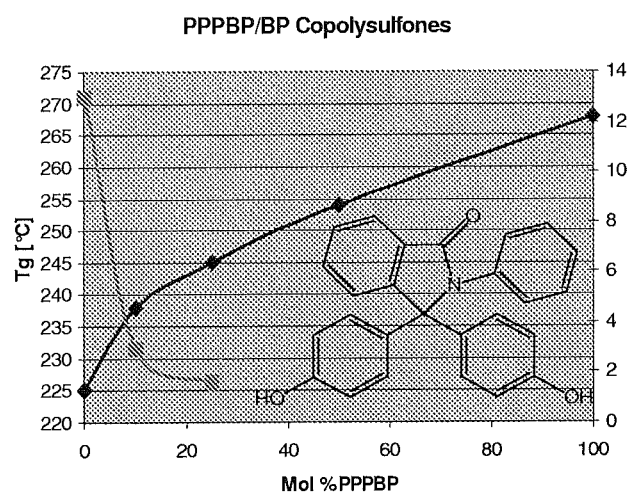
FIG. 2 shows the effect of co-monomer concentration on product polyethersulfone glass transition temperature and Notched Izod value for copolymers of bis(4-chlorophenyl) sulfone, biphenol and a bisphenol lactam monomer.

FIGS. 1 and 2 show that polyethersulfones according to the present invention provide both high Tg and high toughness. For example, polyethersulfones containing 15-30% of units derived from FBPA had Tg ranging from about 235° C. to about 245° C. and IZOD from about 8 ft-lb/in to about 8 ft-lb/in.; polyethersulfones containing 10-25% of units derived from PPPBP had Tg ranging from about 235° C. to about 245° C. and IZOD form about 3 ft-lb/in. to greater than 1 ft-lb/in. In contrast, a polymer composed of units derived from only biphenol and dichlorodiphenylsulfone, without a bisphenol monomer, had a Tg of 224° C. and a Notched IZOD value of about 13 ft-lb/in. Polymers having no biphenol monomer had a Tg of about 280° C. and IZOD of less than 1 ft-lb/in for the FBPA-containing composition and a Tg of about 270° C. and IZOD of less than 1 ft-lb/in for the PPPBP-containing composition.

The invention has been described in detail with particular reference to preferred embodiments thereof, but it will be understood by those skilled in the art that variations and modifications can be effected within the spirit and scope of the invention.

What is claimed is:
1. A polyethersulfone having Tg greater than about 235° C. and a notched Izod value greater than about 1 ft-lb/in, said polyethersulfone consisting of
 from about 10 mol % to less than about 40 mol % structural units of formula 1A; and

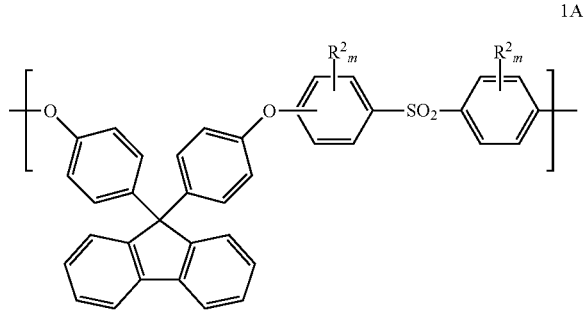

from greater than about 60 mol % to about 90 mol % structural units of formula 2

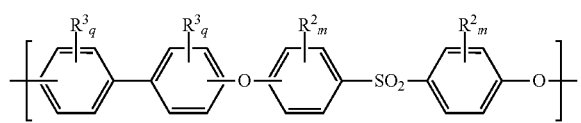

wherein

R² and R³ are independently at each occurrence a halogen atom, a nitro group, a cyano group, a $C_1$-$C_{12}$ aliphatic radical, $C_3$-$C_{12}$ cycloaliphatic radical, or a $C_3$-$C_{12}$ aromatic radical; and n, m, q are independently at each occurrence integers from 0 to 4.

2. A polyethersulfone according to claim 1, consisting of
from about 10 mol % to about 30 mol % structural units of formula 1A; and
from about 70 mol % to about 90 mol % structural units of formula 2.

3. A polyethersulfone according to claim 1, consisting of
from about 15 mol % to about 30 mol % structural units of formula 1A; and
from about 70 mol % to about 95 mol % structural units of formula 2.

4. A polyethersulfone according to claim 1, consisting of
from about 10 mol % to about less than about 35 mol % structural units of formula 1A1; and

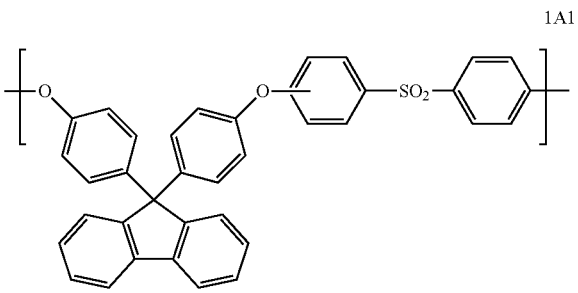

from greater than about 65 mol % to about 90 mol % structural units of formula 2B

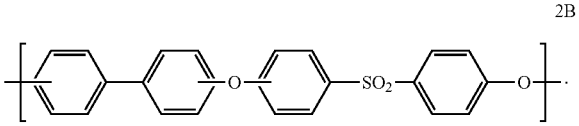

5. A polyethersulfone according to claim 1, consisting of
from about 5 mol % to about 15 mol % structural units of formula 1A; and
from about 85 mol % to about 95 mol % structural units of formula 2.

6. An article comprising a polyethersulfone according to claim 1.

* * * * *